US006698227B2

United States Patent
Rasmussen et al.

(10) Patent No.: US 6,698,227 B2
(45) Date of Patent: Mar. 2, 2004

(54) CONTINUOUS FLOW FREEZING PLANT, IN PARTICULAR FOR EDIBLE ICE PRODUCTS

(75) Inventors: Henrik Rasmussen, Tranbjerg (DK); Morten Kudsk, Brabrand (DK)

(73) Assignee: Tetra Laval Holding & Finance S.A., Pully (CH)

( * ) Notice: Subject to any disclaimer, the term of this patent is extended or adjusted under 35 U.S.C. 154(b) by 0 days.

(21) Appl. No.: 10/182,838

(22) PCT Filed: Feb. 5, 2001

(86) PCT No.: PCT/DK01/00082
§ 371 (c)(1),
(2), (4) Date: Nov. 20, 2002

(87) PCT Pub. No.: WO01/56409
PCT Pub. Date: Aug. 9, 2001

(65) Prior Publication Data
US 2003/0131624 A1 Jul. 17, 2003

(30) Foreign Application Priority Data
Feb. 3, 2000 (DK) .......................... 2000 00176

(51) Int. Cl.$^7$ .............................................. F25D 25/04
(52) U.S. Cl. ............................................ 62/345; 62/380
(58) Field of Search ................................. 62/345, 380

(56) References Cited

U.S. PATENT DOCUMENTS

| 3,701,263 A | 10/1972 | Barrett |
| 4,023,376 A | 5/1977 | Onodera |
| 4,944,162 A | 7/1990 | Lang et al. |
| 5,343,714 A | * 9/1994 | Kiczek et al. ............. 62/381 |
| 5,398,521 A | 3/1995 | Baron et al. |
| 5,520,013 A | 5/1996 | Kuo |
| 5,551,251 A | * 9/1996 | Ochs et al. ............... 62/380 |
| 5,974,692 A | 11/1999 | Pahlsson |

FOREIGN PATENT DOCUMENTS

| DE | 1 601 892 | 9/1970 |
| EP | 0 333 565 B1 | 9/1989 |

* cited by examiner

Primary Examiner—William E. Tapolcai
(74) Attorney, Agent, or Firm—Nixon Peabody LLP; David S. Safran

(57) ABSTRACT

A plant for continuous flow freezing of edible ice products is built up in a freezing section (100) with a tray conveyor (8), the drive chain of which leads trays carrying the items to be frozen from an entrance to the freezing section (100) and around a conveyor support frame (10), and where by means of at least one fan or blower (26), a flow of freezing air from at least one freezing aggregate (24) is brought to pass across the items to be frozen during passage along the conveyor support frame (10). With the view to achieving a maximum speed of the flow of freezing air in relation to the average speed of the air flow across the items, and compact construction while still providing easy access for maintenance and cleaning, there is disclosed an embodiment comprising at least two conveyor support frames (10) placed at the side of each other, and where the frames (10) in all comprise at least one freezing aggregate (24) and at least one fan or blower (26) for driving the flow of freezing air.

11 Claims, 4 Drawing Sheets

CONTINUOUS FLOW FREEZING PLANT, IN PARTICULAR FOR EDIBLE ICE PRODUCTS

Figure 1:
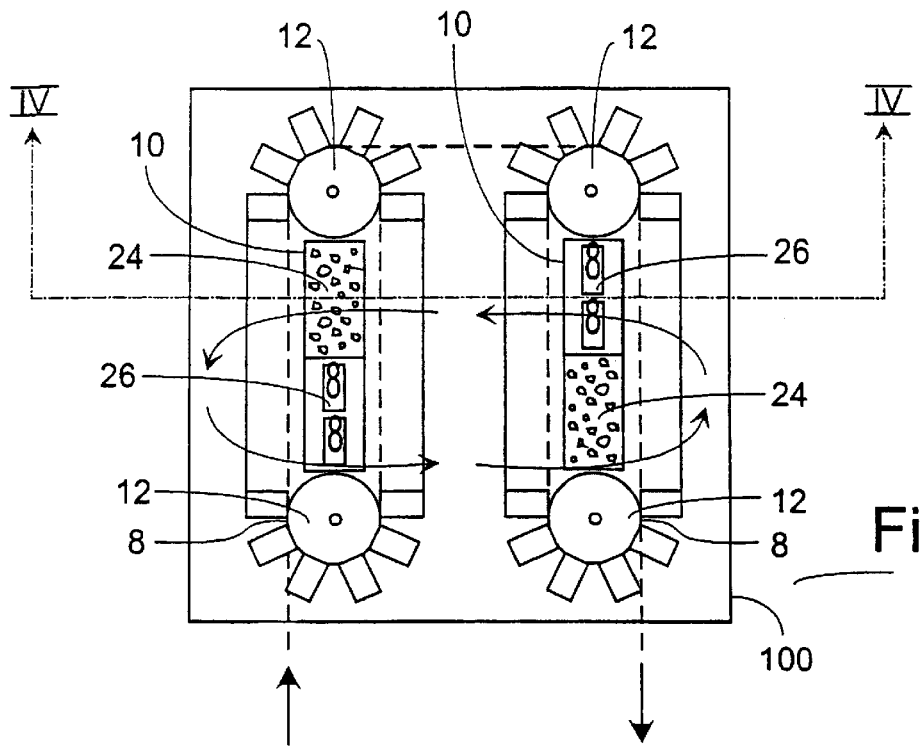

The present invention relates to a plant for continuous flow freezing of items such as edible ice products, which are introduced while in/on a conveyor, namely a tray conveyor of the kind which comprises a conveyor chain with trays or plates supporting the individual items to be frozen extending transversely from the chain, and where the conveyor chain in vertical upwards or downwards direction or in a spiral-like manner, preferably with a plurality of windings hereof in the freezing section of the freezing plant, is guided sideways by driving elements and/or guiding or driving chain wheels engaging with the chain, and is led up and/or down in the freezer from an inlet to an outlet from the freezing section, and where the freezing temperature in the freezing section is provided by means of freezing air circulating in the freezing section, and which is brought about by means of at least one freezing aggregate and at least one associated freezing-air circulation blower or fan maintaining a flow of freezing air which passes around and across the items to be frozen which are transported on the conveyor chain trays. Regardless of its type, in the following, the conveyor will be referred to as a tray conveyor.

A known plant of this kind is described in U.S. Pat. publication No. 5,520,013. In this plant, the chain conveyor is led into the freezing section with several items lying on each tray, and is driven vertically up and down over a central support frame, where on opposite sides of this frame there is arranged a freezing aggregate on the one side and a freezing-air circulation blower on the other side in relation to the frame. According to this USA patent publication, two sets of such aggregate arrangements can exist one above the other, i.e. partly with a first freezing aggregate arranged over the blower belonging to the second of the two freezing aggregates, and partly with the blower belonging to the first freezing aggregate arranged over the second of the two freezing aggregates. Two circulating, horizontally extending flows of circulating freezing air are hereby brought about in the freezer, which subsequently pass through the conveyor chain system supporting the items to be frozen at two different levels of height. With this system, however, in order to hold the trays in place horizontally, use is made of two parallel extending support chains connected to the trays in each their end areas of the individual trays, and the purpose of providing two circulating flows of freezing air is to direct the upper flow with greater air speed than the lower flow. The object herewith is to reduce dehydration and loss of weight of the items as a consequence of pressure difference internally and externally in relation to the freezer, in that the items are thus led into the freezer and out of it again at the bottom of the freezer. Such a plant, however, is best suited only for hardening of the ice, i.e. cooling, especially edible ice products, from a few degrees of frost to a lower deep-freezing storage temperature. On the other hand, the plant displays problems with the air speed, which is too great for the plant to be able to freeze effectively, so that at the same time material losses from the items lying on the trays in more or less open moulds are avoided during the freezing operation, i.e. freezing from a temperature above zero degrees to below freezing point.

Another known plant of the kind disclosed by way of introduction is described in U.S. Patent publication No. 4,023,376. Here, it is the frame placed in the centre of the freezer which supports the tray conveyor, and which as a whole is arranged with cylindrical configuration with a vertical cylinder axis with the frame as a whole being able to, rotate around this axis. On the outside of the frame cylinder there are arranged quite complicated mechanical guiding elements, so that with a plurality of spiral windings the conveyor trays can be conveyed only one way spirally upwards outside, up and around the cylinder. The advantage of this known plant is that the freezer can be configured with the walls of the freezer lying relatively close to the frame cylinder, in that the freezing aggregate and associated fan or blower is disposed in a stationary manner, i.e. without rotation together with the frame cylinder inside the frame cylinder. The circulation of freezing-air is arranged in such a manner that the freezing aggregate and fan or blower are arranged as a unit which leads the flow of air diametrically in relation to and transversely through the frame cylinder, i.e. with a flow plane formed horizontally. Externally in relation to the frame cylinder, the air flow is divided into two branch flows on each side, each of which flows its own way halfway around the outside of the cylinder and into the freezing aggregate for renewed passage through the aggregate. This construction is mechanically recourse-demanding and, moreover, it is so complicated that as a whole it is difficult to clean and troublesome and time-consuming to maintain and service. However, an advantage of this construction is that the air-flow path is shorter than in the first-mentioned construction, and for this reason the air speed can be kept relatively lower, and the loss of energy involved in the freezing is correspondingly lower.

It is the object of the present invention to provide a plant of the kind disclosed in the introduction which is compact and which displays even better freezing conditions, and where the transport arrangement is able to be configured in a considerably less complicated manner, and such that cleaning and maintenance can be effected much more easily.

According to the invention, this is achieved with a plant of the kind disclosed in the introduction, in that at least two frames for the tray conveyor are arranged at the side of each other, each with its inner area and with the tray conveyor, which is supported by the individual frames, being led substantially externally in relation to the inner area of the individual frames, and where there is passage for the flow of freezing-air in the individual frames between the inner and outer area of the frames, and where in at least one of the inner areas of the frames there is arranged at least one cooling aggregate, and where in at least one of the inner areas of the frames there is arranged at least one fan or blower to direct the flow of freezing air passing through the least one cooling aggregate through the conveyor area with items to be frozen lying in at least two of the frames.

According to the invention, the breadth of the frames is of advantage in achieving the shorter path for the flow of freezing air, in that the breadth direction is substantially coincidental with the direction of the passage of the air flow over the items, and is less than the longitudinal extent of the frames, in that the longitudinal extent is oriented substantially in the plane of the air flow circulation.

In this case, for achieving further short paths for the flow of freezing air, according to the invention it is advantageous if the frames are arranged reasonably closely at the side of each other in the breadth direction of the frames.

In all cases, according to the invention it is with advantage possible to achieve lower air flow speed at the same freezing intensity, and also namely low maximal air flow speed over the items, providing that more than one air flow circulation path is correspondingly arranged in the height direction of the frames, in that in each air flow circulation path there is arranged at least one cooling aggregate, correspondingly with at least one fan or blower for driving the individual circulating air flow.

Embodiments according to the invention, as will also appear in the following where embodiments according to the invention are described in more detail, will be able to be provided with quite compact configuration, but still with sufficient space in and around the freezer for far easier access to be gained to the individual construction elements with regard to the carrying out of maintenance work and cleaning operations.

It should thus also be noted that the level of the maximum air speed across the items in the plant is closer to the average air flow speed for the same freezing intensity, in that the plant does not comprise any really narrow passage-ways, and especially not over the items to be frozen. This means that the risk of outer material being blown off the items is reduced to a considerable degree.

Figure 2:
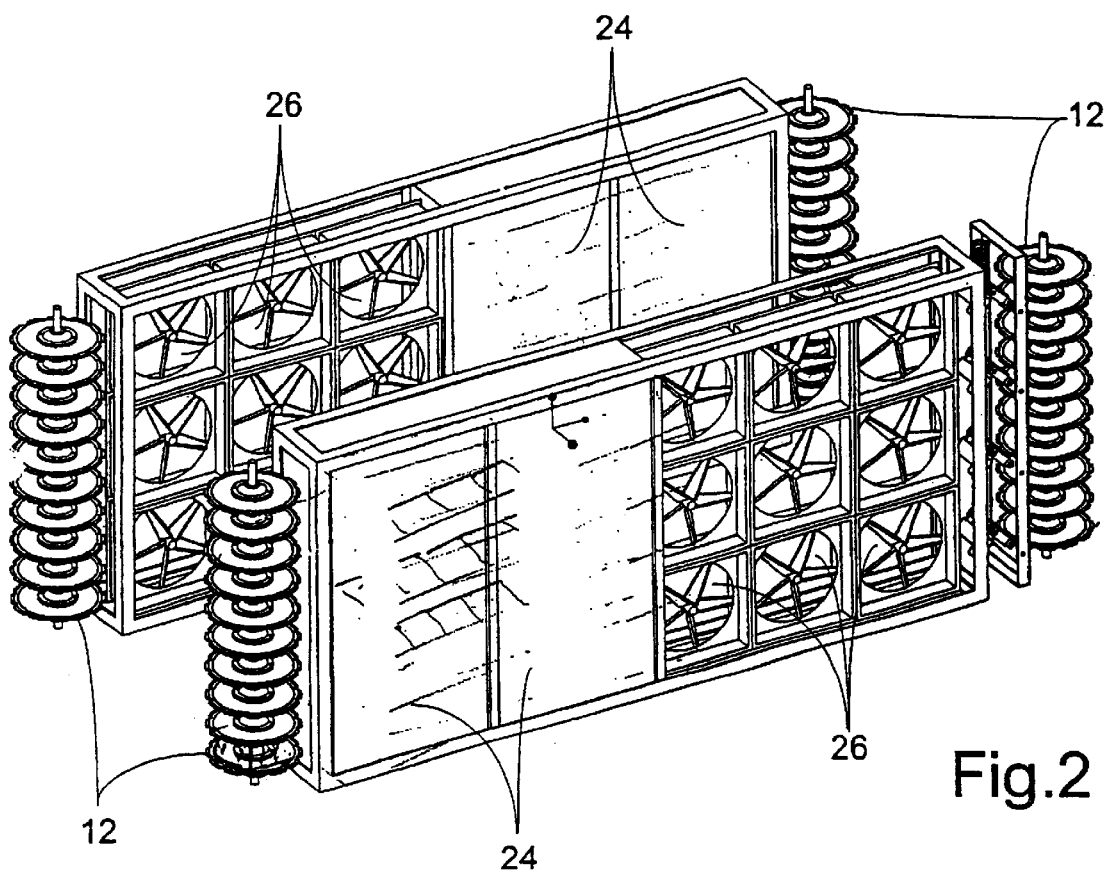
Figure 3:
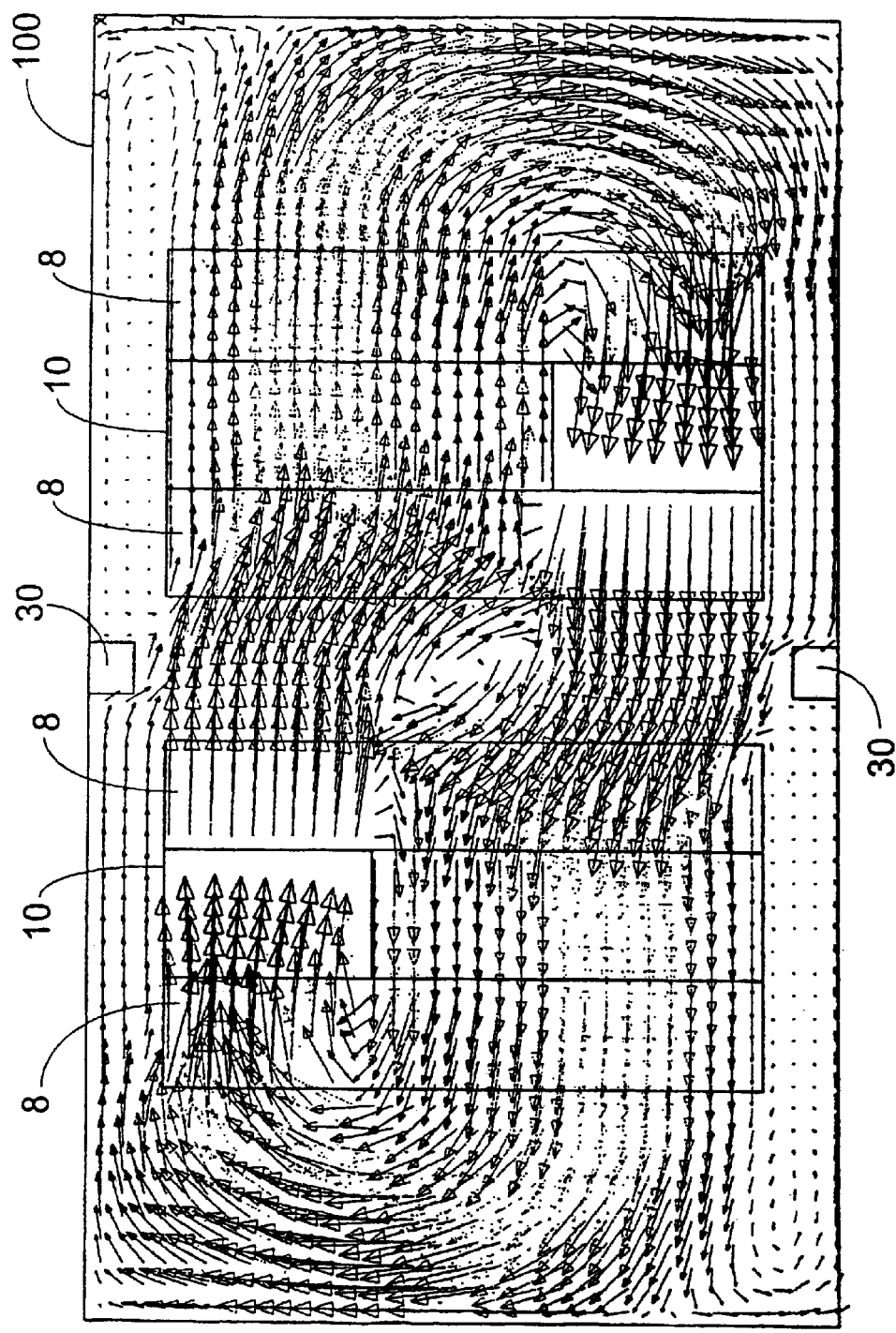
Figure 4:
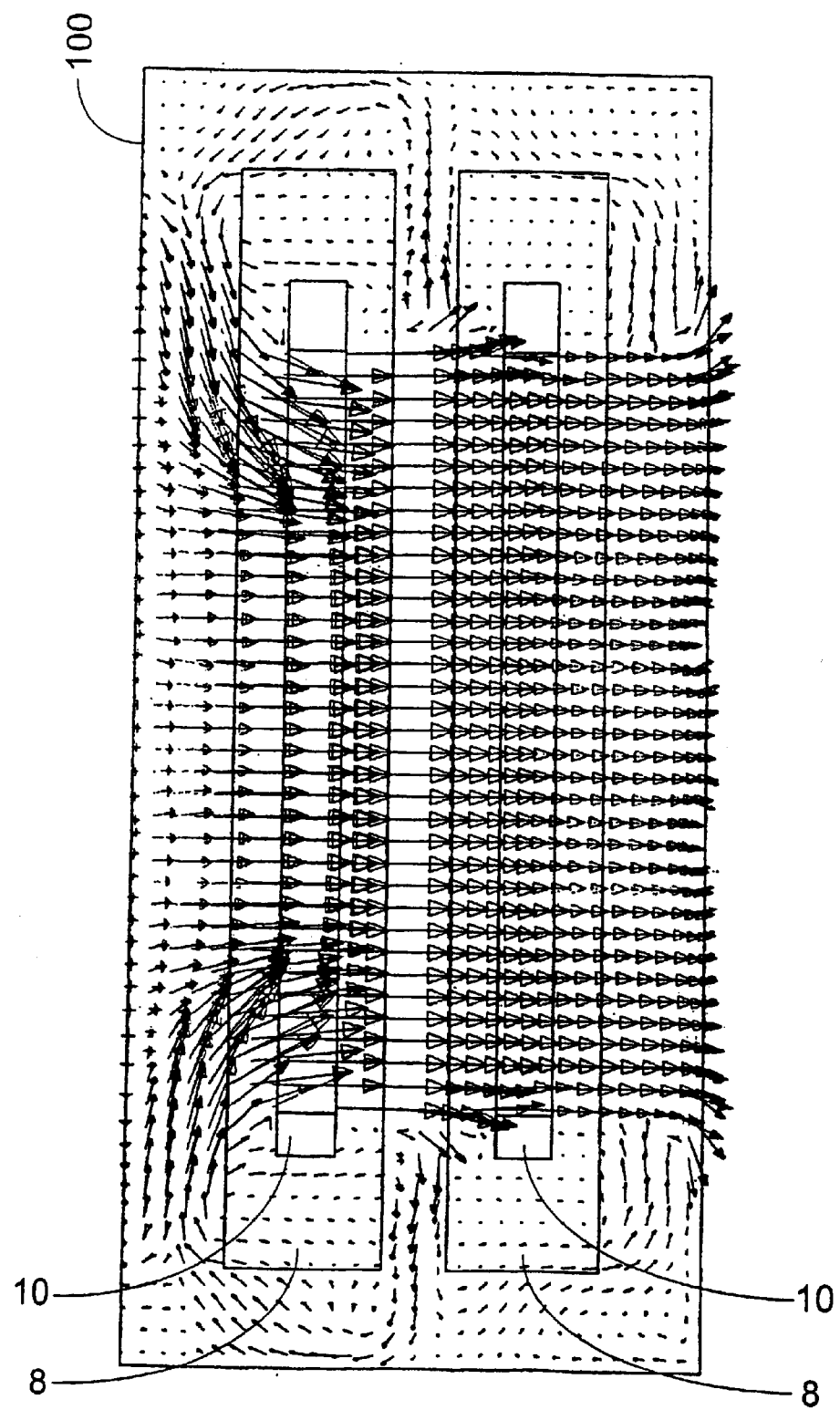
Figure 5:
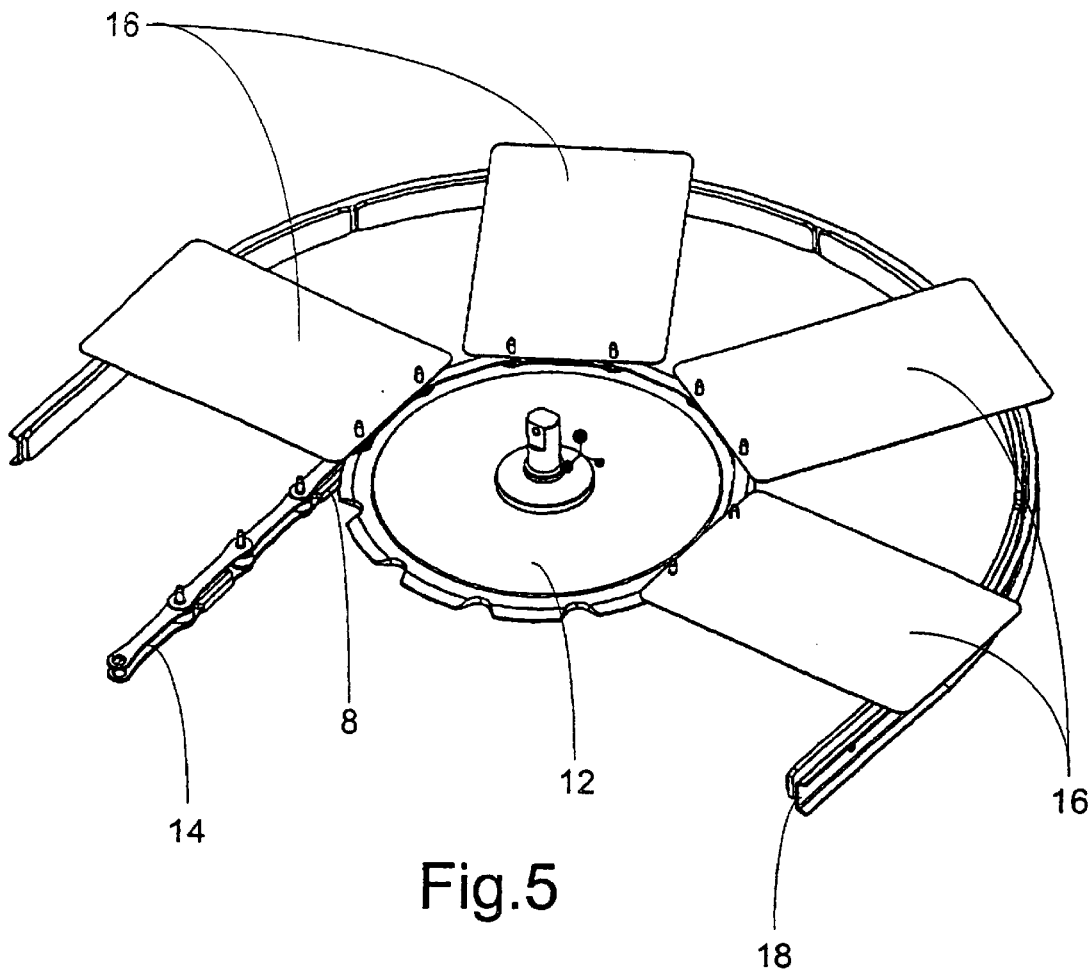
Figure 6:
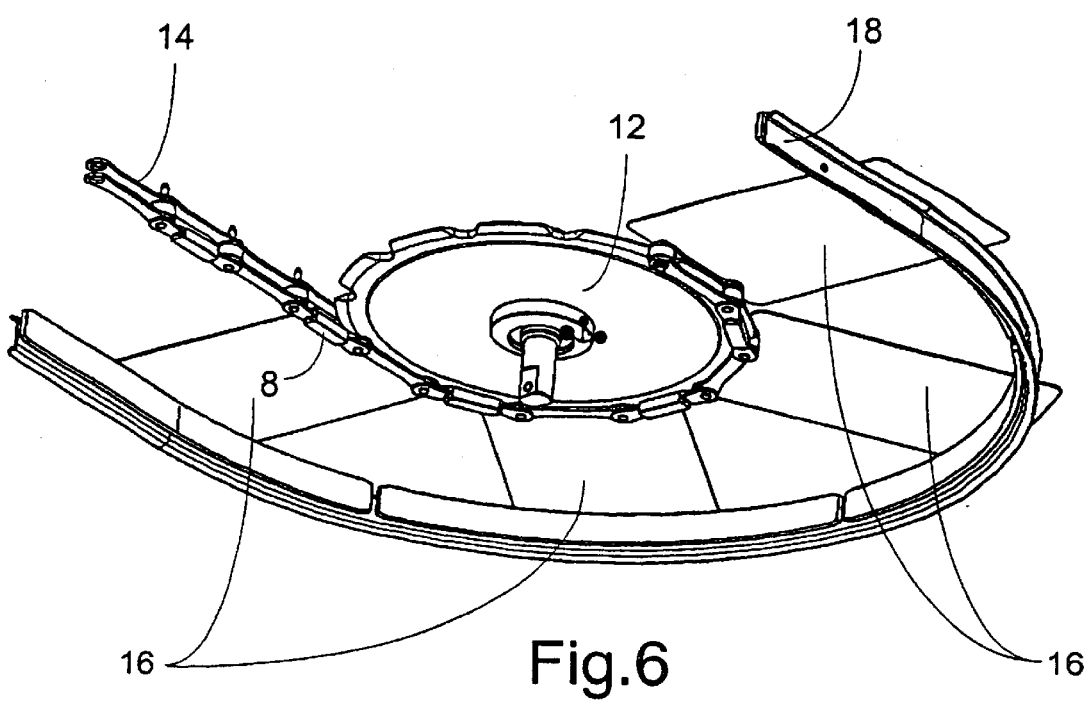

Embodiments according to the invention will now be described in more detail, in that advantageous example embodiments of air-flow circulation according to the invention are disclosed, and with reference to the drawing, in which FIG. 1 shows a horizontal section through an embodiment of the plant according to the invention, FIG. 2 shows an isometric view of the frame with cooling aggregates and fans or blowers and chain wheels for supporting a tray conveyor for items to be frozen, but without showing this conveyor or outer support arrangements for the conveyor, FIG. 3 shows, on a larger scale but with the mechanical elements of the plant indicated only in a stylised manner, the horizontal distribution of the flow of freezing air through and around the two frames, FIG. 4 shows the same as in FIG. 3, but here a vertical section through the plant showing the vertical distribution of the flow of freezing air through and around the two frames, FIG. 5 shows an isometric view seen at an angle from above, of an example embodiment of a tray conveyor driven by a conveyor chain, and shown passing around a chain wheel e.g. such as those shown in FIG. 2, and FIG. 6 shows an isometric view of the same as in FIG. 5, but seen at an angle from below.

As seen in horizontal section through an example embodiment according to the invention shown in FIG. 1, and the isometric view shown in FIG. 2, the plant is arranged with two parallel frames 10, each of which supports a tray conveyor, for example in the form of a chain conveyor of the kind described in more detail in connection with FIGS. 5 and 6. The tray conveyor extends from an entrance (only indicated) to a closed freezing section 100 arranged at the bottom of the freezer in a, spiral-like manner upwards around the frame 10 shown to the left in FIG. 1, and from this continues horizontally in the top of the freezing section 100 over to the top of the frame 10, which is shown to the right in FIG. 1, and further in a helical-like manner downwards around this frame 10 down to an outlet leading out of the freezing section 100. For the driving of the tray conveyor, which is indicated with the reference FIG. 8, substantially horizontal guide wheels or sets of guide wheels 12, which correspond to the number of helical windings, are arranged above each other at the narrow sides of both of the frames. Inside the frames 10, cooling aggregates 24 and fans or blowers 26 are arranged for driving the flow of freezing air though the freezing aggregates 24 and over the items to be frozen which lie in trays in the tray conveyor.

It is seen from FIG. 1 that it is the same flow of freezing air which passes sequentially through the two shown cooling aggregates 24, and during its passage is driven by the two shown fan or blower arrangements 26. The flow of freezing air is indicated with arrows. It is obvious that a part of the air flow will be divided at the inner sides of the left and right walls of the freezing section, and pass around the frames 10 and across the items which are on their way past the chain wheels 12.

In FIG. 2 there is shown a further configuration of the mode of embodiment shown in FIG. 1. It will appear that both the cooling aggregates 24 and the fan or blower arrangements 26 can be arranged divided in bays with individual elements in the individual bays, whereby a more uniform distribution of the air in the flow of freezing air is achieved.

In FIG. 3 of the drawing there is shown a horizontal section through the plant along the line IV—IV in FIG. 1, but with the flow of freezing air shown graphically, partly indicating symbolised speed and partly relative density of the flow sections. According to the invention, it is naturally also possible that the illustrations according to FIGS. 3 and 4 can cover vertically respectively horizontally arranged freezing-air flows instead of horizontally respectively vertically arranged flows, namely in the case where a freezing aggregate co-operates with an air-flow path extending via a fan or blower arrangement placed under the freezing aggregate, and especially if the trays with items can at the same time function as auxiliary guide plates for the air-flow, in which case this variant can be preferred.

That which according to FIG. 3 is interesting is that the freezing effect is clearly stronger across the items to be frozen which are carried on the conveyor 8 opposite the long sides of the frames, and surprisingly it is seen that there is very little mixing of the air between the two oppositely-directed flows of freezing air at the centre of the freezing section between the two frames 10. Consequently, this indicates that it is not necessarily required to place guide plates or baffles to assist in providing the correct guiding of the air flow. It also appears that the air-flow sections over across the chain wheels at the narrow sides of the two frames are relatively modest. It can be expedient, however, to provide the walls of the freezing section opposite the space between the two frames with a projection or a baffle 30.

Correspondingly, FIG. 4 of the drawing shows the air-flow conditions in a vertical section through the plant. It must thus be noted that the horizontal air-flow lines do not end or begin out at the wall(s) of the freezing section 100 at the right side or respectively the left side of the shown vertical section, but are deflected up or down in the plane of the drawing in continuation of the actual horizontal loop course of the air-flow in the freezing section 100.

Also here it is seen that there is only a modest air-flow section extending over or under the frames 10 where possible.

For the illustration of a chain conveyor with trays, FIGS. 5 and 6 show an isometric view, seen at an angle from above and respectively at an angle from below, of a tray conveyor 8 with only one drive chain 14 and trays 16 passing around a supporting and possibly also driving chain wheel 12, and where an outer support rail configured as a slide rail 18 supports the outer edge of the trays.

What is claimed is:

1. A plant for continuous flow freezing of items which are introduced into an enclosed freezing section while on a driven tray conveyor which includes an inner area, comprising:

a conveyor chain which is guided on a side by driving elements in a vertically upwards or a vertically downwards direction in a spiral-like manner and which is led upwardly and downwardly in the freezing section from an inlet to an outlet of the freezing plant;

a means for freezing air circulating in the freezing section which includes at least one freezing aggregate and at least one associated freezing-air circulation blower or fan for maintaining a flow of freezing air passing around and across the items to be frozen while the items are transported on the tray conveyor; and at least two frames in the freezing section, wherein the at least two frames are positioned adjacent each other and arranged within the inner area of the tray conveyor and wherein each of the at least two frames have an inner area and an outer area and support the tray conveyor on the outer area of the at least two frames, wherein each of the at least two frames have a passage for freezing air between the inner area and the outer area of each of the at least two frames, and wherein the inner area of at least one of the frames supports within the inner area of the frame the at least one cooling aggregate and the inner area of the at least one of the frames supports within the inner area of the frame the at least one fan or blower for guiding the flow of the freezing air through the at least one cooling aggregate, through the outer area of the at least two frames and through the tray conveyor with items to be frozen lying thereon.

2. The plant of claim 1, wherein the tray conveyor includes trays or plates adapted to support items which are edible ice products.

3. The plant of claim 1, wherein the conveyor chain further includes trays or plates extending transversely from the conveyor chain which are adapted to support individual items to be frozen.

4. The plant of claim 1, wherein the conveyor chain includes a plurality of windings about the at least two frames.

5. The plant of claim 1, wherein the tray conveyor is driven in a substantially external manner relative to the inner area of the at least two frames.

6. The plant of claim 1, wherein the driving elements include guiding or driving chain wheels engaging with the chain.

7. The plant of claim 1, wherein for each of the at least two frames the breadth dimension of the frame is less than the longitudinal dimension of the frame, and the breadth dimension of each of the at least two frames substantially coincides with the direction of the air flow passage and the longitudinal dimension of each of the at least two frames is oriented substantially in a plane of the air-flow in the outer area of the at least two frames.

8. The plant of claim 1, wherein the at least two frames are arranged in close proximity to each other in the breadth dimension of the at least two frames.

9. The plant of claim 1, wherein more than one associated freezing-air circulation blower or fan is provided within the inner area of the at least one frame to create a plurality of air-flow circulation paths in the height dimension of the at least two frames and wherein at least one cooling aggregate is arranged in each air-flow circulation path.

10. The plant of claim 1, wherein more than one associated freezing-air circulation blower or fan is provided within the inner area of the at least one frame to create a plurality of air-flow circulation paths in the width dimension of the at least two frames.

11. The plant of claim 1, wherein the freezing section includes a plurality of walls positioned opposite a space between the at least two frames and wherein each wall includes a bulge or baffle for redirecting air-flow.

* * * * *